United States Patent [19]
Pedersen

[11] Patent Number: 6,149,820
[45] Date of Patent: *Nov. 21, 2000

[54] CATALYST, PROCESS AND PROCESS UNIT FOR THE ABATEMENT OF NOXIOUS COMPOUNDS IN WATER

[75] Inventor: Karsten Pedersen, Silkeborg, Denmark

[73] Assignee: Haldor Topsoe A/S, Lyngby, Denmark

[*] Notice: This patent issued on a continued prosecution application filed under 37 CFR 1.53(d), and is subject to the twenty year patent term provisions of 35 U.S.C. 154(a)(2).

[21] Appl. No.: 09/175,847

[22] Filed: Oct. 20, 1998

[30] Foreign Application Priority Data

Oct. 20, 1997 [DK] Denmark .................................. 1201/97

[51] Int. Cl.⁷ ....................................................... C02F 1/72
[52] U.S. Cl. .......................... 210/747; 210/758; 210/763; 210/908
[58] Field of Search ..................... 210/758, 760, 210/762, 763, 908, 747; 502/182, 185, 324

[56] References Cited

U.S. PATENT DOCUMENTS

| | | | |
|---|---|---|---|
| 2,966,455 | 12/1960 | Stuart | 208/254 |
| 4,029,578 | 6/1977 | Turk | 210/63 Z |
| 4,343,776 | 8/1982 | Carr et al. | 423/210 |
| 4,405,507 | 9/1983 | Carr et al. | 252/466 B |
| 5,057,220 | 10/1991 | Harada et al. | 210/762 |
| 5,362,405 | 11/1994 | Birbara et al. | 210/763 |
| 5,505,856 | 4/1996 | Campen et al. | 210/763 |
| 5,770,093 | 6/1998 | Shiota et al. | 210/762 |

FOREIGN PATENT DOCUMENTS

| | | |
|---|---|---|
| 0354664 | 2/1990 | European Pat. Off. . |
| 0607636 | 7/1994 | European Pat. Off. . |
| 50-35955 | 4/1975 | Japan . |
| 1218634 | 8/1989 | Japan . |
| 1419537 | 12/1975 | United Kingdom . |
| 2089671 | 6/1982 | United Kingdom . |
| 9014312 | 11/1990 | WIPO . |

*Primary Examiner*—Duane Smith
*Assistant Examiner*—Frank M. Lawrence
*Attorney, Agent, or Firm*—Ostrolenk, Faber, Gerb & Soffen, LLP

[57] ABSTRACT

A catalyst for use in abatement of organic compounds, including noxious compounds in water, wherein the water in a first step is enriched with ozone/oxygen. The enriched water is then passed through a catalyst, consisting of activated carbon as carrier for metal oxides including iron oxide, cobalt oxide, nickel oxides, manganese oxide. Furthermore, the catalyst can contain one or more of the noble metals, preferably platinum or palladium. By the catalyst, undesired intermediate products from the ozone treatment are avoided. The catalyst is employed in a water treating plant and in a process for treatment of water.

10 Claims, 1 Drawing Sheet

CATALYST, PROCESS AND PROCESS UNIT FOR THE ABATEMENT OF NOXIOUS COMPOUNDS IN WATER

BACKGROUND OF THE INVENTION

The present invention relates to a solid state catalyst process and plant for the abatement of organic compounds including noxious compounds contained in water by enrichment of the water with ozone/oxygen and then contacting the water with a catalyst.

A number of methods are known in the art to substantially or partly remove noxious compounds from drinking water. The usual methods are UV-treatment, absorption on activated carbon and treatment with ozone. In the patent literature, certain catalysts are further suggested for the abatement of organic compounds from water.

UV-treatment is employed to decompose or partly decompose organic compounds by radiation with ultraviolet light. UV-units demand excessive maintenance and are expensive due to high power consumption of about 1 KWH/$m^3$ water. The UV-radiation tubes must frequently be cleaned due to deposited solids, mainly precipitated manganese and iron oxide. Sediments can be removed with hydrochloric acid.

Activated carbon can be employed in the removal of organic noxious compounds which readily absorb to high molecular compounds. The activity of activated carbon decreases gradually with the amount of absorbed compounds, thereby, causing frequent replacement of active coal loadings.

The amount of active coal used in the loadings depends on concentration of organic material in the water to be treated. Usual retention times in carbon filters of about 15 minutes correspond to about 0.25 $m^3$ activated carbon/$m^3$ water/hour. There are no safe data for those units, but the loadings have to be replaced once a year caused by saturation with organic material and biological growth in cleaning vessels, which can form biofilms.

Biofilms may clog the surface, and thus destroy purification properties of carbon.

Ozone is used in a number of units for the treatment of drinking water.

Ozone decomposes some organic compounds partly. Odorous smell is removed. Minor amounts of pesticides are removed by ozone treatment, but ozone is not effective in the removal of all kinds of pesticides and decomposition products of pesticides. Ozonization methods are used in disinfection and removal of smell from surface water in combination with after-treatment with activated carbon.

Catalysts being active in purification of air and water are known in the art.

DE-A-3,149,901 discloses a catalyst for the decomposition of ozone in gases. The catalyst is employed in the removal of ozone from processes, wherein ozone is formed e.g. photo copying, ozonisation units or in the disinfection of water, air cleaning, bleaching, etc, as ozone is noxious in higher concentration (0.2–1 ppm).

Treatment of water with a catalyst, which is not supported on activated carbon is known from EP-A-354,664. This method is not directed to removal of noxious organic compounds, but in removal of smell, in bleaching or sterilization, and to remove excess of ozone from water. The catalyst is composed of one or more compounds from titania, silica, zirconia, manganese, iron, cobalt, nickel, cerium, tungsten, copper, silver, and gold, palladium, platinum, rhodium, ruthenium and iridium.

U.S. Pat. No. 4,029,578 discloses a process for the treatment of drinking water or waste water with ozone and a heterogen catalyst without activated carbon.

The catalyst is composed of at least two compounds of copper, cadmium, iron, cobalt, nickel in a ceramic material of alumina or silica. The preferred catalyst is a mixture of iron and cobalt on alumina.

GB-A-2,089,671 relates to ozone decomposition in air on a catalyst. The preferred catalyst is Pd/Co/alumina. This patent publication discloses gaseous phase reactions and a catalyst based on a ceramic carrier.

Filter units with a material of titania, silica and zirconia or mixtures of these oxides are mentioned in DE-A-2,156,571. Carbon is not disclosed as carrier.

Thus, many methods to purify water are known in the art. Clean drinking water is vital and increasingly rare. In many areas ground water reserves disappear with increasing consumption and pollution. There are many sources of grounds water pollution, including pollution from industrial areas and dumping grounds additionally use of fertilizers and pesticides in farming.

Additional sources are e.g. leaky sewers, emission of waste water or pollution from pipelines or discontinued oil tanks.

Common to all sources of pollution is that they are threatening drinking water quality. To limit these problems different restrictions on waste water discharge and introduction of cleaner technology have been made.

Problems emerging these years, are the result of previous years of fertilizer consumption, use of pesticides and dumping of waste water. It is expected that ground water pollution will increase over the years to come.

In particular, pesticides have very low concentration limits of 0.1 $\mu$m/l. Concentration limits are problematic as new compounds enter the market continuously for use in extreme low amounts. As an example, the pesticide chlorosulphuron can be used in amount of 4 g/10,000 sq. meters. In comparison, 1–4 kg atrazine/10,000 sq. meters have to be used, but both compounds have the same limit of concentration.

International investigations have shown that more than 30 pesticides are potentially soluble, whereas present experiments are concentrated towards the pesticides atrazine and phenoxy acids (hormone agents).

SUMMARY OF THE INVENTION

Based on the above problems with pollution of drinking water, this invention is directed to catalytic wet oxidation for the purification of water from pesticides, phenols and related noxious compounds.

More particular, this invention provides a catalyst for the removal of organic noxious compounds in water with addition of ozone. The catalyst is active when ozone and oxygen in water react with the organic compounds to carbon dioxide and water on the catalyst. Thereby, undesired oxidized intermediates are avoided like organic radicals, aldehydes and organic acids, which usually are found in ozone treated water polluted with organic noxious compounds.

The catalyst consists of a porous carrier of activated carbon with added metal oxides of iron, cobalt, nickel or manganese and a noble metal, preferably platinum. The method is applicable in the removal of pesticides, phenol and similar organic pollutants in water.

Preferably, the catalyst consists of activated carbon support having a high porosity (approx. 50–70%) and a large internal surface (300–1000 m$^2$/g), on which a metal oxide is supported by use of a specific impregnation method and subsequent heat treatment. The metal oxide is catalytically active and has the specific property to change easily its oxidation state. The decomposition mechanism is considered to be formed of a metallic superoxide by reaction of ozone and the metal oxide. The super oxide adsorbs and oxidizes organic compounds, which are progressively oxidized by shift of the metal oxides oxidation state. No undesired decomposition products are thus formed during the purification process.

Experiments with difficult decomposable dichloro benzene have shown that the activated carbon carrier material increases conversion rate for metal oxides of iron, cobalt, nickel and manganese compared to the unsupported oxides.

Additionally, it has been shown that addition of small amounts of noble metal like platinum increases furthermore the conversion rate. Activated carbon is shown to be the optimal carrier material when ozone/oxygen periodically are not-present in the water. During absence of ozone/oxygen activated carbon adsorbs the organic compounds on the surface, which then are removed when ozone/oxygen is subsequently present in the aqueous phase. Thus, the carrier material acts as buffer during process variations.

A process plant for the treatment of water according to the invention, in particular for abatement of organic compounds including noxious compounds in water, comprises a unit for enrichment of raw water with ozone and a subsequent unit with a catalyst as disclosed herein before. Raw water to be treated for the abatement of organic noxious compounds is passed to the purification process after conventional airing for the removal of gases like methane and oxidation of the water to precipitate manganese and iron oxide (ochre). The sole operation cost is consumption of power for production of ozone.

In a process for the treatment of raw water, particularly removal of organic compounds including noxious compounds according to the invention, the water is enriched with ozone and then passed through the catalyst as mentioned above.

BRIEF DESCRIPTION OF THE DRAWINGS

The invention will be described more detailed in the following by reference to the drawings, in which.

DETAILED DESCRIPTION OF THE PREFERRED EMBODIMENTS

Figure 1:
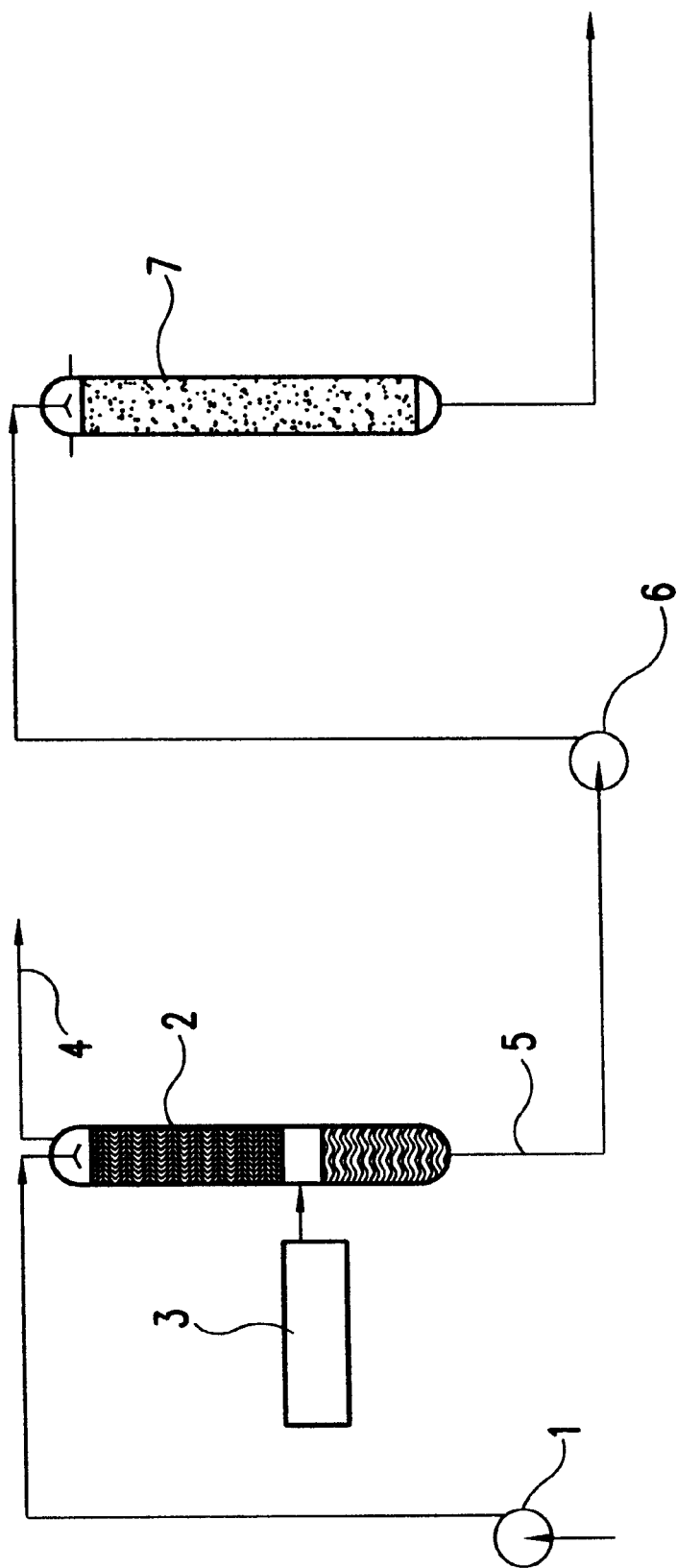
FIG. 1, is a specific embodiment of a plant for the treatment of water according to invention.

Referring to FIG. 1, drinking water is pumped with pump 1 to water tower 2, wherein ozone from ozone generator 3 is dissolved in the water by introducing ozone enriched air at bottom of the tower and the water at the top. The water is saturated with ozone by passage through filler bodies in the tower.

1–10 g ozone per m$^3$ drinking water are used.

The drinking water 5 is then pumped with pump 6 to vessel 7 loaded with granular catalyst.

During passage of the water through the reactor, ozone and organic material are adsorbed on the inner catalyst surface and oxidized to carbon dioxide and water.

Optionally, the liquid tower for ozone enrichment and the vessel with the catalyst may be combined to one reactor if there is enough space. When combining the two units pump 6 is avoided between the two processes.

In the tests, a catalyst with cylindrical shape was used. The diameter of the catalyst was 2.7 mm with a length of about 6 mm. About 450 ml catalyst were loaded in a PVC-tube with an inner diameter of 28.8 mm. The length of the catalyst loading was 700 mm. Water from a water-work with a degree of hardness of 15 was used in the tests. The water temperature was 12° C. being the usual temperature of ground water. To the water was admixed dichlorobenzene in an amount corresponding to a concentration of 1.0 mg dichlorobenzene per liter water. Subsequently, ozone was introduced into the water in the PVC-tube having a hydraulic diameter of 100 mm and a column length of 1000 mm loaded with metallic filler bodies. 363 l of water with a temperature of 15° C. were passed to top of the tube. Ozone containing air from a generator was introduced into bottom of the tube in counterflow with the water stream.

Ozone was generated through electrical discharge at 230 Nl/h 1 of dried air in a dielectric.

After passage through the ozone generator the ozone concentration was 25 g/m$^3$ measured by iodometric titration with sodium thiosulphate.

6 g/h of ozone were passed to the absorption tube, resulting in an ozone concentration downstream the tower of 4 mg/l, which is close to the saturation limit of ozone at the actual concentration in the introduced air. During the test, the amount of ozone was excessive in the tower due to the small amount of water to be saturated.

A sidestream of 12.5 l/h water was withdrawn from the absorption tower. The water contained ozone and dichlorobenzene. The sidestream was introduced into the vessel with catalyst. During 35–45 hours on stream, the conversion of dichlorobenzene was constant, which shows the efficiency of the catalyst.

The concentration of dichlorobenzene in water was determined by gas chromatography after concentrating samples by SPME (solid phase micro extraction) available from Spectachrom.

In the tests a very short retention time (about 2.5 min) was employed and a catalyst with a relatively large particle size to expedite evaluation of the most appropriate catalyst. Longer retention time and smaller particle size increases conversion of organic compounds.

EXAMPLE 1

The alumina catalyst carrier was ball-shaped with an average diameter of 3 mm. The pore volume of the alumina carrier was 385 ml/kg and the internal surface area 250 m$^2$/g.

The active carbon was in form of extrudates, cylindric shaped with a diameter of 2.7 mm. The average length was 7 mm. The equivalent ball diameter was 3.3 mm. The pore volume of the active carbon was 780 ml/kg. The internal surface area was 500 m$^2$/g.

The sizes of the alumina and active carbon were nearly equivalent, giving comparable conversions from the following investigation.

The catalysts were made by impregnation of the dry carriers with water soluble metal salts. The concentrations resulted in a metal oxide content in the catalyst of 7 wt %. The impregnation was carried out at room temperature and lasted 4 hours.

After the impregnation, the external liquid was drained from the carrier. The impregnated carrier was sequently placed in a container with a lid, which allowed steam to leave the container and prevented air to enter. In this way the oxygen of the atmosphere was prevented to react with the metal salts and the active carbon.

The containers were placed in an oven, in which the temperature increased from 20 to 400° C. over a period of 10 hours. The final temperature of 400° C. was maintained for 6 hours, which was sufficient to decompose the metal salts to the corresponding metal oxides.

The catalysts with a content of noble metals were made by impregnation of the catalyst containing metal oxides with aqueous solutions with dihydrogenhexa-chloro-platinate or palladium dichloride. The impregnation lasted for 4 hours followed by a thermal treatment, as described above.

The results are summarized in Table 1 below. From the Table, it is seen that iron oxide and manganese oxide are active with aluminum oxide as carrier.

The activity is significantly increased for the catalytic active oxides of iron, cobalt, nickel and manganese, when the carrier is active carbon.

The activities of the catalysts are increased further, when to platinum or palladium are added catalytic active metal oxides supported by active carbon.

The experiments revealed that the activities of the carrier materials are low.

Addition of platinum alone to the active carbon carrier results in an activity lower than the active carbon alone. This might be a result of decomposition of ozone rather than an activation of the oxygen on the catalyst surface.

The addition of the oxides of copper and molybdenum to active carbon has no catalytic effect.

film. After penetrating the film, the organic matter is diffusing through the pores in the catalyst support to the active material, where the oxidation is taking place.

The observed reaction rate of the organic matter is proportional to the concentration and is expressed by the following equation:

$$R = C*K \, [\text{kmole/hour/m}^3]$$

By integration over a catalyst bed the following equation is obtained:

$$K = -\ln(1-X)*F/V$$

wherein:
C is Concentration of the matter converted [kmole/m$^3$];
R is Reaction rate [kmole/hour/m$^3$];
X is Fraction of conversion;
F is Flow of water [m$^3$/hour];
K is Observed rate constant [liter/hour].

As the diffusion rate constant $K_f$ through the liquid film and the rate constant $K_c$ of the catalyst is related to reactions in series, the following equation is obtained:

$$1/K = 1/K_c + 1/K_f \text{ or}$$

$$K_c = 1/(1/K - 11/K_f).$$

The rate constants of the different catalysts are calculated from the above equations and listed in Table 1.

TABLE 1

| No | Catalyst | Content wt % | Impregnation salt | Concentration g/litre | Carrier | Rate constant [1/hour] | Conversion % of 1,4-dichlorobenzene |
|---|---|---|---|---|---|---|---|
| 1 | — | — | None | — | Al$_2$O$_3$ | 2.2 | 7.3 |
| 2 | — | — | None | — | C | 8.2 | 22.9 |
| 3 | CuO | 7 | Cu(C$_2$H$_3$O$_2$)$_2$ *H$_2$O | 236.9 | C | 6.5 | 19.0 |
| 4 | MoO | 7 | (NH$_4$)$_6$Mo$_7$O$_{24}$*H$_2$O | 115.7 | C | 7.3 | 21.0 |
| 5 | Pt | 0,1 | H$_2$PtCl$_6$*6H$_2$O | 6.9 | C | 1.5 | 5.0 |
| 6 | MnO$_2$ | 7 | Mn(C$_2$H$_3$O$_2$)$_2$*4H$_2$O | 512.5 | Al$_2$O$_3$ | 18.8 | 40.1 |
| 7 | FeO | 7 | NH$_4$Fe(III)citrate (30% oxide) | 606.1 | Al$_2$O$_3$ | 26.0 | 47.8 |
| 8 | CoO | 7 | CONO$_3$*6H$_2$O | 706.1 | Al$_2$O$_3$ | 7.0 | 20.1 |
| 9 | NiO | 7 | NiNO$_3$*6H$_2$O | 705.6 | Al$_2$O$_3$ | 1.0 | 3.3 |
| 10 | MnO$_2$ | 7 | Mn(C$_2$H$_3$O$_2$)$_2$*4H$_2$O | 272.3 | C | 222.6 | 81.3 |
| 11 | FeO | 7 | NH$_4$Fe(III)citrate (30% oxide) | 315.5 | C | 203.9 | 80.7 |
| 12 | CoO | 7 | CONO$_3$*6H$_2$O | 366.4 | C | 1155.2 | 86.7 |
| 13 | NiO | 7 | NiNO$_3$*6H$_2$O | 367.2 | C | 183.2 | 79.9 |
| 14 | MnO$_2$/Pt | 7/0,01 | H$_2$PtCl$_6$*6H$_2$O | 0.36 | MnO$_2$/C | 1251.4 | 86.8 |
| 15 | FeO/Pt | 7/0,01 | H$_2$PtCl$_6$*6H$_2$O | 0.36 | FeO/C | 790.7 | 86.1 |
| 16 | MnO$_2$/Pd | 7/0,01 | PdCl$_2$*2H$_2$O | 0.27 | MnO$_2$/C | 751.2 | 86.0 |
| 17 | FeO/Pd | 7/0,01 | PdCl$_2$*2H$_2$O | 0.27 | FeO/C | 700.5 | 85.0 |

The upper catalyst activity is limited by the mass transport restrictions through the liquid film surrounding the catalyst pellets. The highest obtainable conversion with a flowrate of 12.5 liter water per hour is 88%.

By mass transport restriction in the liquid film, the the rate is limited by diffusion rate of the organic matter through the

EXAMPLE 2

The most active catalyst (MnO$_2$/Pt) from the experiments described in Example 1, was produced in a larger amount of 50 liters. The support of active carbon was shaped as cylindric extrudates with a diameter of 0.9 mm and an average length of 6 mm. The impregnation was made with the concentrations listed in Example 1, but in a single impregnation with both metal salts. After the impregnation, the catalyst was placed in an oven in which it was possible to recirculate and control the atmosphere. Steam and carbon dioxide were recirculated during heating for 20 hours to 400° C., in which the metal salts in the support decomposed to the active oxides.

A pilot plant was constructed after the same principles as described above. The pilot was used for demonstration of the water cleaning process and was designed for purification of 500 liter water per hour. The pilot was placed at a waterworks and tested on water polluted mainly with atrazine, simazine and BAM (2,6-dichlorobenzamide). The pollution originated from a country road, at which earlier large amounts of pesticides in the grass verges have been used. An investigation has shown that the pollution is approximately 20 years old.

Raw water in an amount of 500 liters per hour was conducted to top of a stripper/absorption unit. The unit was filled with column packing material of stainless steel (Interpack VFF 10) with an external surface area of 620 $m^2/m^3$ and a void of 90%. The packing had a height of 1000 mm and a diameter of 100 mm.

Dry air containing ozone was introduced under the packing material. By the passage of air and water through the column, ozone is dissolved in the water, which is leaving at bottom of the column. The ozone rich water is pumped to a reactor, filled with 50 liters of the catalyst. All soluble organic matter was removed from the water by the wet oxidation catalyst. Furthermore, all ozone was removed from the water.

From the top of absorption unit 2, in which the water is enriched with ozone, air 4 is leaving with volatile organic matter stripped from the water. The air is cleaned catalytically in a small combustion unit (not shown), in which the air is heated to an inlet temperature of 270° C. The heat of reaction from ozone destruction and combustion of organic matter resulted in a temperature increase of approximately 50° C. There were no traces of ozone or organic matter in the air leaving the combustion unit.

The water for the experiments had the following specifications:

| | |
|---|---|
| Colour | 2 mg/l |
| Turbidity | 0.27 FTU |
| Temperature | 9.5° C. |
| pH at 12° C. | 7.39 |
| Conductivity at 12° | 572 s/cm |
| Permanganate number ($KMnO_4$) | 2.8 mg/l |
| NVOC | 1.6–2.2 mg/l |
| Dry residues | 532 mg/l |
| Sodiumhydrogencarbonate | 0 mg/l |
| Calcium ($Ca^{++}$) | 129 mg/l |
| Magnesium ($Mg^{++}$) | 16 mg/l |
| Sodium ($Na^{++}$) | 15 mg/l |
| Calcium($K^+$) | 3.5 mg/l |
| Ammomium ($NH_4^+$) | <0.001 mg/l |
| Iron-total (Fe) | 0.025 mg/l |
| Manganese-total (Mn) | <0.005 mg/l |
| Nickel ($Ni^+$) | 0.015 mg/l |
| Hydrogen carbonate ($HCO_3^-$) | 323 mg/l |
| Chloride ($Cl^-$) | 44 mg/l |
| Sulphate ($SO_4^{--}$) | 93 mg/l |
| Nitrate ($NO_3^-$) | 10 mg/l |
| Nitrite $NO_2^-$) | <0.001 mg/l |
| Phosphor-total (P) | <0.001 mg/l |
| Fluoride (F) | 0.28 mg/l |
| Silica ($SiO_2$) | 21 mg/l |
| Oxygen ($O_2$) | 9.3 mg/l |

-continued

| | |
|---|---|
| Carbon dioxide vat 12° C. ($CO_3$) | 20 mg/l |
| Carbon dioxide aggr. at 12° C. | 0 mg/l |

The water was taken from a relief well. The pilot was on stream for 4555 hours. There were only short interruptions in the period.

The concentration of ozone in the water was controlled frequently by iodometric titration of water samples with sodium thiosulphate following the guidelines:

A water sample of 200 ml was added 50 ml 8 wt % potassium iodide. Ozone in the water oxidizes the colourless iodide ($I^-$) to free iodine (I), which is yellow. This solution is titrated with a solution of sodiumthiosulphate, which reduces the free iodine to iodide (I–). The amount of thiosulphate solution is proportional to the ozone concentration in the water.

The concentration of ozone in the raw water to the reactor with the catalyst changed between 2.5 and 6.5 mg/l with an average concentration of 4.5 mg/l.

The flow of water was fluctuating between 420 and 510 l/h with an average flow of 480 l/h.

The concentration of ozone varied during the experiment despite the air flow to the ozonizing unit was constant at 230 Nl/hour. The reason for the variation was a failure of the air dryer (a pressure swing adsorption unit) before the ozonizing unit.

At the high concentration of ozone in the water the dewpoint of the air was below −40° C. At two occasions the dewpoint was too high and around 0° C., which resulted in an ozone concentration in the water around 2.5 mg/l, against the normal value around 4–6 mg/l.

During the pilot experiment analysis were made of the following pesticides:
Phenoxy acids: Mechlorprop, MCPA, Dichlorprop, 2,4-D
Triazines: Atrazine, Simazine, Hexazinone
Phenols: DNOC, Dinoseb
Chlorobenzene derivates: Dichlorobenile
Metabolites of Dichlorobenile: 2,6-Dichlorbenzamide (BAM)

The analysis of the raw water showed only a content of the pesticides: Atrazine, Simazine and 2,6-Dichlorbenzamide (BAM).

TABLE 2

| | Hours on stream | | | | |
|---|---|---|---|---|---|
| | 330 | 555 | 767 | 3529 | 4555 |
| | Date | | | | |
| | 21/10-97 | 4/11-97 | 18/11-97 | 2/3-98 | 15/4-98 |
| Water inlet | | | | | |
| Atrazine ng/l | trace | — | — | — | — |
| Simazine ng/l | 18 | 18 | 14 | — | 14 |
| BAM ng/l | 96 | 70 | 36 | 48 | 45 |
| $O_3$ mg/l | 4.1 | 4.0 | 4.2 | 2.5 | 6.4 |
| Purified water | | | | | |
| Atrazine ng/l | — | — | — | — | — |
| Simazine ng/l | — | — | — | — | — |
| BAM ng/l | — | — | — | 27 | — |
| $O_3$ mg/l | <0.1 | <0.1 | <0.1 | <0.1 | <0.1 |

It is seen from the results in Table 2 that the catalyst is converting all pesticides, when the concentration of ozone is equal or higher than 4 mg/liter. At a lower concentration of ozone of 2.5 mg/l, the conversion of BAM was 44%.

The invention is in particular advantageous when used in water works, where an ozonisation unit and a subsequent filter unit of activated carbon already exists. In those works the loading of activated carbon can then be replaced with catalyst and the unit is then theoretically free of maintenance, as the catalyst removes noxious compounds without being used up.

What is claimed is:

1. A continuous process for abatement of organic compounds in ground water, comprising the steps of:

enriching the ground water at usual ground water temperature with ozone and/or oxygen to obtain enriched water; and passing the enriched water to a catalyst comprising activated carbon as carrier material and at least one metal oxide supported on the activated carbon and selected from the group consisting of the oxides of iron, cobalt, nickel and manganese to obtain purified ground water.

2. The process of claim 1, wherein the activated carbon carrier material has a porosity of 50–70%.

3. The process of claim 1, wherein the activated carbon material has an internal surface of 300–1000 $m^2/g$.

4. The process according to claim 1, wherein the water in the first step is enriched with ozone.

5. The process according to claim 4, wherein the catalyst comprises from 0.1 to 40% oxides of iron, cobalt or nickel.

6. The process according to claim 4, wherein the catalyst comprises from 0.1 to 40% manganese oxide.

7. The process according to claim 4, wherein the catalyst comprises one or more noble metals.

8. The process according to claim 7, wherein the noble metals are selected from the group consisting of platinum and palladium.

9. The process according to claim 4, wherein the catalyst comprises manganese oxide and platinum supported on the activated carbon carrier material.

10. The process according to claim 4, wherein the temperature of the water to be treated is below 100° C. at ambient pressure.

* * * * *